UNITED STATES PATENT OFFICE.

HUGH W. WALKER AND THOMAS L. PATTERSON, OF GREENOCK, SCOTLAND.

IMPROVEMENT IN FLAVORED SIRUPS.

Specification forming part of Letters Patent No. 200,780, dated February 26, 1878; application filed September 24, 1877.

*To all whom it may concern:*

Be it known that we, HUGH WILLIAM WALKER and THOMAS LAW PATTERSON, both of Greenock, in the county of Renfrew, Scotland, have invented a new and useful Improvement in Flavored Sirups, of which the following is a specification:

The object of our invention is to produce flavored sirups or preserves for domestic use from the residual saccharine juices of sugar manufacture; and this object we attain in the manner which we will now proceed to describe.

The residual saccharine juices of sugar manufacture have heretofore had but little if any market value.

By our invention these residual juices are utilized for making flavored sirups ready for domestic use.

The saccharine juice is first treated by any of the well-known processes for rendering the final product uncrystallizable. For this purpose the sirup may be treated with sulphuric or other acid in the ordinary manner; but this particular process does not form an essential part of the present application, as any of the methods known to sugar-refiners may be employed for the purpose described. The liquid is then neutralized and filtered, and, if desired, it may be clarified by chemical agents. The juice is next concentrated in the usual manner, and we then prefer to finally clarify it by the process for which we have already made application for Letters Patent.

At any stage of the treatment of the sweet liquid or sirup, as described, we impart to it the desired flavor and aroma by combining with it the corresponding fruit-essence or essential oil, either obtained from fruit or flowers or obtained artificially. Such artificial essence may be any one of those known to chemists as particular organic salts of alcohol radicals.

The proportions of the flavoring essences to be used in different cases will depend on the strength or flavoring power of the essences employed, and on strength of flavor desired to be imparted to the sirups; but, by way of example, we may state that in making what may be termed "pine-apple sirup" we mix with every twenty-five cubic feet, equal to about one ton of sirup, three and a half pounds of the commercial oil known as "essence of pine-apple." Although, as hereinbefore stated, the fruit-essence may be combined with the sirup at any stage of the treatment of the latter, still we prefer to add it in the vacuum or concentrating pan shortly before the final concentration is completed. After the addition the boiling is continued for a few minutes to render the mixture thoroughly homogeneous, and the charge in the pan is then let go or discharged as usual.

If the fruit-essence is combined with the sirup after the latter has left the pan it must be thoroughly incorporated with the sirup by means of stirrers or agitators driven mechanically or otherwise.

It should be understood that our flavored sirups are not like the thin mixtures used for flavoring aerated waters, and which are of a comparatively low specific gravity, and are made from and contain crystallizable sugar; but our flavored sirups are of a specific gravity of at least 1.420, and are to be used like ordinary treacle, fruit-jams, or preserves for table use and similar purposes. Notwithstanding the high specific gravity of our flavored sirups they are not liable to crystallize, because they have been previously rendered uncrystallizable, and do not therefore contain crystallizable sugar.

We claim as our invention—

The within-described flavored sirups, consisting of the residual juices of sugar manufacture, rendered uncrystallizable and mixed with flavoring extracts, as set forth.

In testimony whereof we have signed our names to this specification in the presence of two subscribing witnesses.

HUGH WM. WALKER.
T. L. PATTERSON.

Witnesses:
JOHN NOBLE, *Clerk,*
JAMES ALEXANDER, *Clerk.*